Nov. 8, 1938. W. H. WHITE Re. 20,913
TRACK SANDER
Original Filed Feb. 8, 1934 2 Sheets-Sheet 1
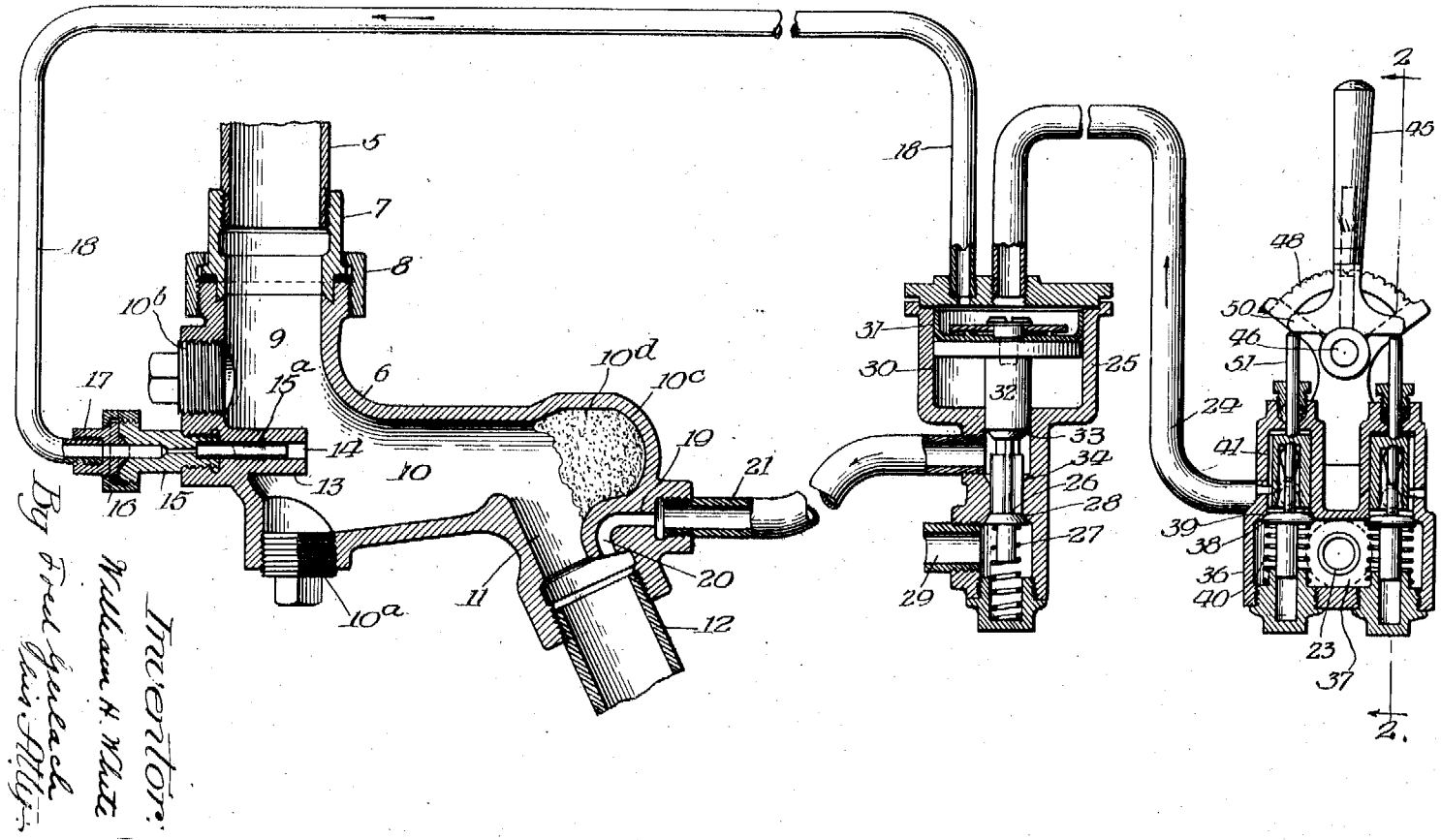

Nov. 8, 1938. W. H. WHITE Re. 20,913
TRACK SANDER
Original Filed Feb. 8, 1934 2 Sheets-Sheet 2
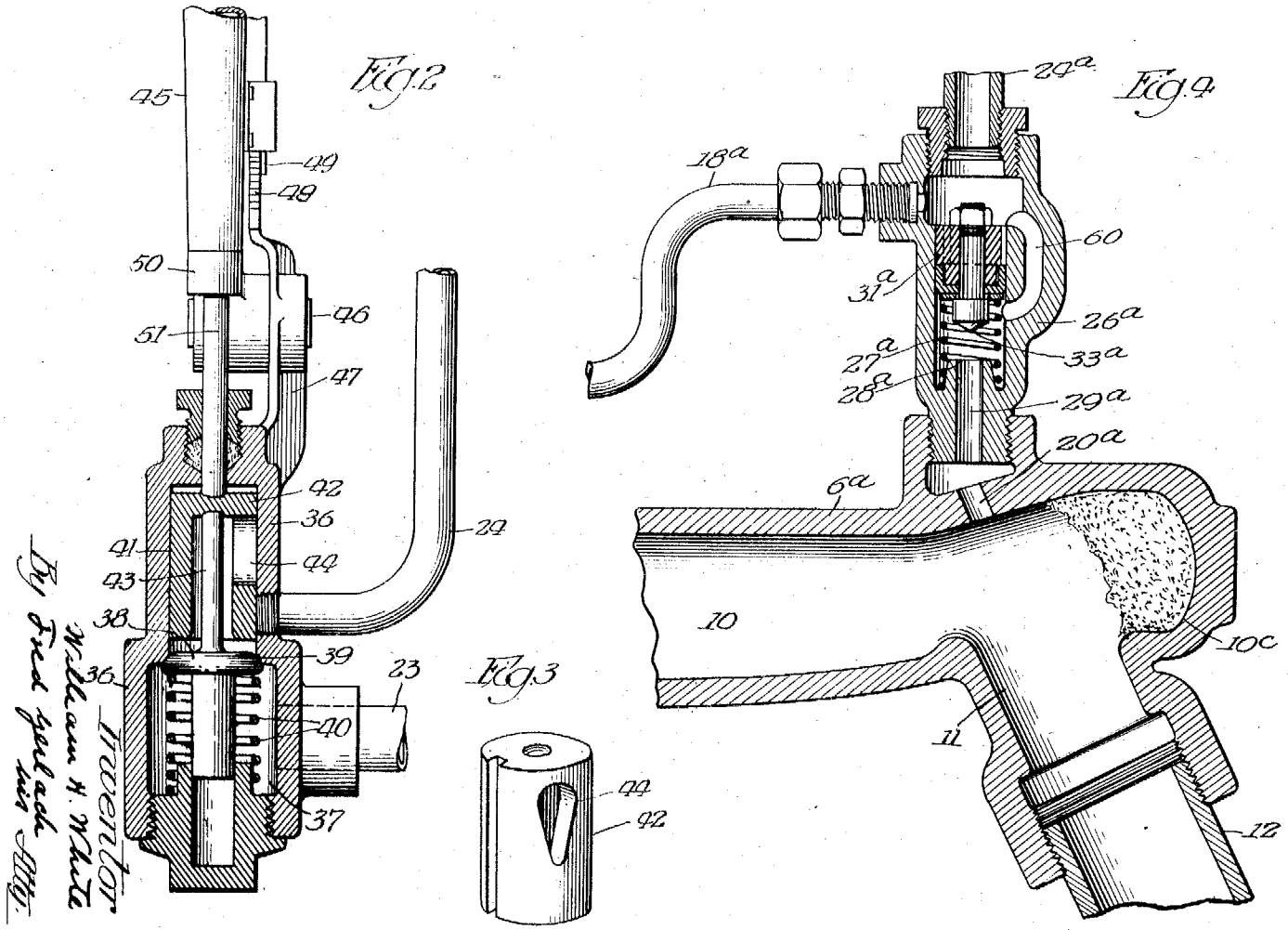

Reissued Nov. 8, 1938

Re. 20,913

UNITED STATES PATENT OFFICE 20,913

TRACK SANDER

William H. White, Roanoke, Va., assignor to Morris B. Brewster Co. Inc., Chicago, Ill.

Original No. 2,030,669, dated February 11, 1936, Serial No. 710,257, February 8, 1934. Application for reissue November 15, 1937, Serial No. 176,077

3 Claims. (Cl. 291—3)

One object of the invention is to provide a track sanding apparatus of the type under consideration in which the casing embodies a pair of serially connected passages for delivering fluid under pressure through the outlet duct for cleaning purposes and these passages are formed in a member which is formed integrally with, and as a part of, the lower portion of the discharge end of the casing.

Another object of the invention is to provide a track sanding apparatus of the type and character hereunder consideration in which the outlet end of the casing embodies integral means forming a pocket for permitting a portion of the sand in the casing to pack therein and to form a surface for deflecting the moving sand in the casing into the outlet duct.

A further object of the invention is to provide a track sanding apparatus which includes a novel automatic valve for effecting supply of fluid under pressure to the cleaning passages during the initial flow of fluid under pressure to the nozzle.

A still further object of the invention is to provide a track sanding apparatus which includes a novel control device for the fluid for sanding and cleaning.

In addition it is contemplated as one of the objects of the invention to provide a track sanding apparatus which is generally of new and improved construction and is extremely efficient in operation.

Other objects of the invention and the various advantages and characteristics of the present track sanding apparatus will appear from a consideration of the following detailed description.

In the drawings which accompany and form a part of the present specification or disclosure and in which like numerals of reference denote corresponding parts throughout the several views:

Figure 1 is a sectional view of a sanding apparatus embodying the invention;

Figure 2 is a section on the line 2—2 of Figure 1;

Figure 3 is a perspective of the supplemental valve of the controlling device; and Figure 4 is a section illustrating a modified form of the invention.

The track sanding apparatus which forms the subject of the invention is adapted for use with a locomotive and comprises an elongated, horizontally extending casing 6. The latter is provided at one end with an inlet duct 9 which is connected to a pipe 5 by means of a nipple 7 and union 8. This pipe 5 leads from the usual sand box on top of the boiler of the locomotive to the casing 6 and serves to deliver sand into a trap conduit 10 in the casing. Adjacent the other end of the casing, an obliquely or downwardly extending outlet duct 11 is formed and a discharge pipe 12 is connected to this duct and extends to the point adjacent the rail where the sand is to be delivered. A housing 13 is formed integrally with the casing and extends inwardly from the wall of the casing 6 which closes the inlet end of the casing. This housing projects into the trap conduit 10 and has a duct 14 through which fluid under pressure is discharged into said conduit 10 to force the sand from the casing through the outlet duct 11 and the discharge pipe 12. A nozzle comprises a pipe 15$^a$ which extends into the duct 14 and a nipple 15 in which the pipe is fixedly secured. The nipple 15 is screw-threaded into the wall of the casing 6 and is connected to a pipe 18 by means of a nipple 17 and coupling 16. This nipple 15 is formed with a restricted orifice for delivering a jet of fluid under pressure into the trap conduit. The fluid under pressure is supplied to the pipe 18 as hereinafter set forth. The housing 13 projects into the trap conduit of the casing a sufficient extent so that when the pipe and nipple parts of the nozzle are removed for cleaning or replacement, the sand in the trap chamber will not flow out of the casing through the duct 14. A cleaning plug 10$^a$ is threaded into the casing 6 below the housing 13 and a cleaning plug 10$^b$ is threaded into the casing above said housing. These plugs, when removed, permit any material which clogs the casing to be removed.

A pocket 10$^c$ is formed in the discharge end of the casing 6 opposite the point of the delivery of the fluid by the nozzle. This pocket, as indicated at 10$^d$, will be packed with sand so that the blast from the nozzle and the sand carried thereby, will be impacted against the sand packed in the pocket and deflected downwardly to the discharge pipe 12 without subjecting to wear the cross wall at the discharge end of the casing 6.

A horizontal passage 19 extends inwardly from the discharge end of the casing and joins an oblique passage 20. These two passages serve to discharge fluid for cleaning the discharge pipe downwardly in and substantially axially of discharge pipe 12. Fluid under pressure is delivered to the passage 19 by a pipe 21 as hereinafter set forth. The passages 19, 20 are formed in a member which is formed as an integral portion of the casing 6, and is arranged so that it overlies a portion of the duct 11 and forms the bottom of the pocket 10c. By reason of the fact that the passage 20 extends downwardly in a line substantially parallel with the discharge pipe 12, the flow of the cleaning fluid does not cross or retard the stream of sand and the fluid used for forcing the sand in its passage to the discharge pipe.

A device for automatically controlling the delivery of fluid to the pipe 21 comprises a casing 25 in the lower portion of which a valve 26 is slidably mounted. This valve is normally closed by a spring 27 and is adapted to close against a seat 28. A pipe 29 delivers fluid under pressure from a reservoir to the chamber below the valve so that when said valve is open, the fluid will pass to the pipe 21 and thence to the cleaning passages 19 and 20. In practice, it is desired to control automatically the flow of fluid to the cleaning passages so that the fluid will be delivered into the discharge pipe 12 for a limited period to clear the pipe at the beginning of each sanding operation. For this purpose, a cylinder 30 is formed in the upper portion of casing 25 and a piston 31 is slidably fitted in said cylinder. This piston has a stem 32 which is guided in the lower portion of the casing 25 and is adapted to abut against the upper end of the stem of the valve 26 to open said valve. A pipe 24 which is connected to a control device in the cab of the locomotive, as hereinafter set forth, is adapted to deliver fluid under pressure to the upper end of the cylinder 30 and above the piston 31 so that the upper end of said piston will be exposed to the pressure of fluid in the top of the cylinder. Pipe 18 which leads to the sanding nozzle is also connected to the upper end of the cylinder 30. The capacity of the pipe 24 is somewhat greater than that of the pipe 18 so that a differential pressure will be created in the upper end of the cylinder to cause the piston to be slowly forced downwardly to open the valve 26 at the beginning of each sanding operation. As the flow of fluid continues through the upper end of the cylinder 30, the piston will be gradually forced downward. The lower end of the stem 32 of the piston 31 is provided with a valve 33 which is adapted to fit against a seat 34 between the pipes 21 and 29. As a result, after a limited period of sanding, the supply of fluid through pipe 21 to the cleaning duct will be automatically cut off by the pressure-operated valve 33. When the supply of fluid under pressure through pipe 24 is discontinued, the spring 27 will lift valves 26, 33 and piston 31 to cut off the supply of fluid to the cleaning duct at the valve 26. This automatic means for controlling the fluid for cleaning exemplifies one which is included in the pipe line between the control device in the cab and the sanding nozzle so that a single pipe line serves to deliver fluid under pressure to the sanding nozzle and to control automatically the fluid for controlling the valve for the cleaning line.

The improved control device comprises a casing 36 which may, if desired, be provided with duplicate devices for controlling two sanding devices from a single control lever although it is to be understood that it is adapted for use with a single sanding device. The lower portion of the casing 36 is provided with a chamber 37 to which fluid under pressure is delivered by a pipe 23 from the usual supply reservoir. A valve 38 is slidably mounted in the casing and adapted to close against a seat 39. A spring 40 holds valve 38 normally closed. The casing has formed in its upper portion above the valve seat, a cylindrical extension 41 into one side of which the pipe 24 for delivering fluid to the sander is connected. A hollow supplemental valve 42 with a closed top is slidably fitted in the cylinder 41.

Valve 38 is provided with a stem 43 which extends upwardly to the top wall of the valve 42 so that the valve 38 will be shifted downwardly when the supplemental valve is shifted. A wedge-shaped opening 44 is formed in one side of the valve 42 which, when said valve is shifted downwardly, will move into registry with the pipe 24. From its lower end the opening 44 is of gradually and progressively increasing width so that the volume of the fluid permitted to pass through pipe 24 may be accurately controlled and regulated or graduated by the extent of movement of the valve 42. As a result, when the valve 44 is shifted downwardly, valve 38 which permits a free flow of fluid will be initially opened and the position of the opening 44 in valve 42, according to the extent to which it is lowered, will determine the volume of the flow through the pipe 24 to the sander. A key-pin (see Fig. 1) extends into a longitudinal groove in the side of valve 42 (see Fig. 3), to prevent rotation of the valve.

A lever 45 is pivoted at 46 to an upwardly extending lug 47 on the casing 36 and a notched quadrant 48 is formed on said lug. The lever 45 is provided with a spring pressed locking finger 49 which is adapted to hold the lever 45 in its assigned position. Lever 45 is provided with an arm 50 which is adapted to engage a plunger 51 which extends through a packing box on the top of the casing 36 to shift the supplemental valve 44 and the valve 38. The valves 38 and 42 are duplicated to control two sanding devices through shifting of the lever to one side or the other of its neutral position. By shift of the lever 45, the extent of moving the supplemental valve 42 may be varied to a nicety to control the volume of fluid to the sender to deliver the desired amount of sand to the track. The area of the piston 31 which is exposed to the pressure of the fluid from the pipe 24 is sufficient to insure the operation of the valves 28 and 33 of the device for cleaning the discharge pipe 12, under the minimum or maximum volumetric flow of the fluid to the sanding nozzle through pipe 18.

In the modified form of the invention illustrated in Figure 4 a pipe 24a leads from the control device in the cab to the upper end of a casing 26a and a pipe 18a leads from said casing to the sanding nozzle. The lower end of casing 26a is screw-threaded into the casing 6a which contains the trap conduit 10. A duct 20a, axially aligned with the discharge pipe 12, is adapted to deliver fluid through the casing 6a into the discharge pipe 12 for cleaning out the latter. A valve seat 28a is formed in casing 26a and a duct 29a leads from the valve seat to the duct 20a. A piston 31a is slidably mounted in casing 26a and carries at its lower end a valve 33a which is adapted to engage the seat 28a to cut off the supply of fluid to the cleaning duct 20a. A by-pass duct 60 is formed in the casing 26a and extends around the piston 31a. In the operation of this device the initial delivery of fluid to pipe 24a from the controlling device in the cab will exert pressure on the upper end of the piston 31a, and the fluid will flow through by-pass 60 around the piston and through duct 29a to the duct 20a. As the pressure builds up in the top of the casing 26a the piston will move downwardly and cause the valve 33[a] to close on the seat 28[a] and automatically discontinue the supply of fluid to the cleaning ducts. This valve will remain closed thereafter until the control device is set to discontinue the sanding operation. The spring 27[a] will then lift piston 31[a] and valve 33[a] until the control device is again set to operate the sander. This construction exemplifies one in which the automatically controlled device for cleaning the fluid is located in the pipe line between the control device in the cab and the sander nozzle and the fluid for cleaning the discharge pipe is also supplied through the single pipe line from the cab.

The invention is not to be understood as restricted to the particular details set forth, since these may be modified within the scope of the appended claims, without departing from the spirit and scope of the invention.

Having thus described the invention, what I claim as new and desire to secure by Letters Patent is:

1. In sanding apparatus of the character described, the combination of an elongated, horizontally extending casing provided with an inlet duct for sand, a downwardly extending outlet duct and a cross wall outwardly of the outlet duct at its other end, and a longitudinally extending trap-conduit between the two ducts, a discharge pipe connected to said outlet duct, a nozzle at said one end of the casing for discharging fluid under pressure into the trap conduit to force sand through the outlet duct, and means for cleaning the discharge pipe with fluid under pressure comprising a member formed integrally with, and as a part of, the lower portion of said other end of the casing and having a horizontal inlet passage for the fluid leading through the cross wall and a discharge passage leading downwardly from the inner end of the inlet passage and arranged to discharge the fluid into and longitudinally of the discharge pipe, said member being arranged so that it overlies the rear portion of the outlet duct of the casing and forms with said cross wall and the other portions of said other end of the casing a pocket for permitting a portion of the sand in the casing to pack therein and to deflect into the outlet duct the sand moved by the fluid under pressure from the nozzle.

2. In sanding apparatus of the character described, the combination of a casing having an inlet duct for sand, an outlet duct for sand, and a trap-conduit between the inlet and outlet ducts, a nozzle in the casing for discharging fluid into the trap-conduit to force sand through the outlet duct, a discharge pipe for conducting the sand from said outlet duct to the point of use, a passage in the casing for delivering fluid to clean the discharge pipe, a remote control device connected to receive fluid under pressure from a source of supply, a pipe connection between the control device and the nozzle for delivering fluid to the trap-conduit, and means in said connection for automatically controlling the delivery of fluid to the cleaning passage comprising a valve casing through which fluid passes in transit from the control device to the nozzle, having an outlet leading to the cleaning passage, a normally open valve for controlling the flow of fluid through the casing outlet, a piston in the casing for shifting the valve into its closed position when fluid passes through the casing in transit from the control devices of the nozzle, and a by-pass for fluid formed in the valve casing, for delivering fluid to the casing outlet for delivery to the cleaning passage when the valve is open.

3. In sanding apparatus of the character described, the combination of a first casing having an inlet duct for sand, an outlet duct for sand, and a trap-conduit between the inlet and the outlet duct, a nozzle in said first casing for discharging fluid under pressure into the trap-conduit to force sand through the outlet duct, and a device for controlling the delivery of fluid to said nozzle comprising a second casing provided with a chamber connected to receive fluid under pressure from a source of supply and also provided with an extension having a bore with one end thereof leading to and communicating with the chamber and a lateral outlet at its other end connected to deliver fluid to the nozzle, a valve at said one end of the bore for controlling the flow of fluid from the chamber to the bore, a hollow sleeve-type valve through which the fluid flows from the bore to the outlet, said sleeve-type valve being slidably mounted in the bore and spaced from said first mentioned valve and having a wedge-shaped side opening adapted in response to shift of the sleeve-type valve to control the amount or volume of fluid flowing through the sleeve-type valve to the outlet and means for conjointly opening and closing the two valves, said side opening being arranged so that first the small end thereof and then the large end is brought into registry with the outlet in response to progressive opening of the sleeve-type valve.

WILLIAM H. WHITE.